United States Patent [19]

Jackson

[11] 3,814,383
[45] June 4, 1974

[54] METHOD OF STRINGING AERIAL CABLE
[75] Inventor: Richard L. Jackson, Lewisburg, Ohio
[73] Assignee: Jackson Communication Corporation, Clayton, Ohio
[22] Filed: Feb. 8, 1973
[21] Appl. No.: 330,500

[52] U.S. Cl. .................................... 254/134.3 CL
[51] Int. Cl. ........................................ E21c 29/16
[58] Field of Search ............ 254/134.3 R, 134.3 CL

[56] References Cited
UNITED STATES PATENTS
2,332,112   10/1943   Pritchard .................. 254/134.3 CL
2,822,146   2/1958   Ridgers et al. ............. 254/134.3 CL
3,137,765   6/1964   Lanum ........................ 254/134.3 R FOREIGN PATENTS OR APPLICATIONS
169,097   10/1959   Sweden ..................... 254/134.3 CL Primary Examiner—Al Lawrence Smith
Assistant Examiner—Robert C. Watson
Attorney, Agent, or Firm—Biebel, French & Bugg

[57] ABSTRACT

A method of stringing aerial cable, such as coaxial cable, from an existing messenger strand. A coil of resilient, temporary, supporting wire is positioned about an existing messenger strand adjacent one of the messenger strand supports and an end of the coil is anchored to the messenger. A cable puller is positioned on the messenger and an opposite end of the coil is attached to the cable puller. The cable to be installed is then threaded through the coil and attached to the puller. The puller is then moved along the messenger, uncoiling the temporary supporting wire and positioning the cable beneath the messenger. A lasher is then mounted on the messenger adjacent an end of the expanded coil and the coil attached to the messenger. The lasher is then propelled along the messenger, recoiling the temporary supporting wire and applying a permanent helical wrapping about the messenger and the cable to attach the cable to the messenger.

6 Claims, 5 Drawing Figures

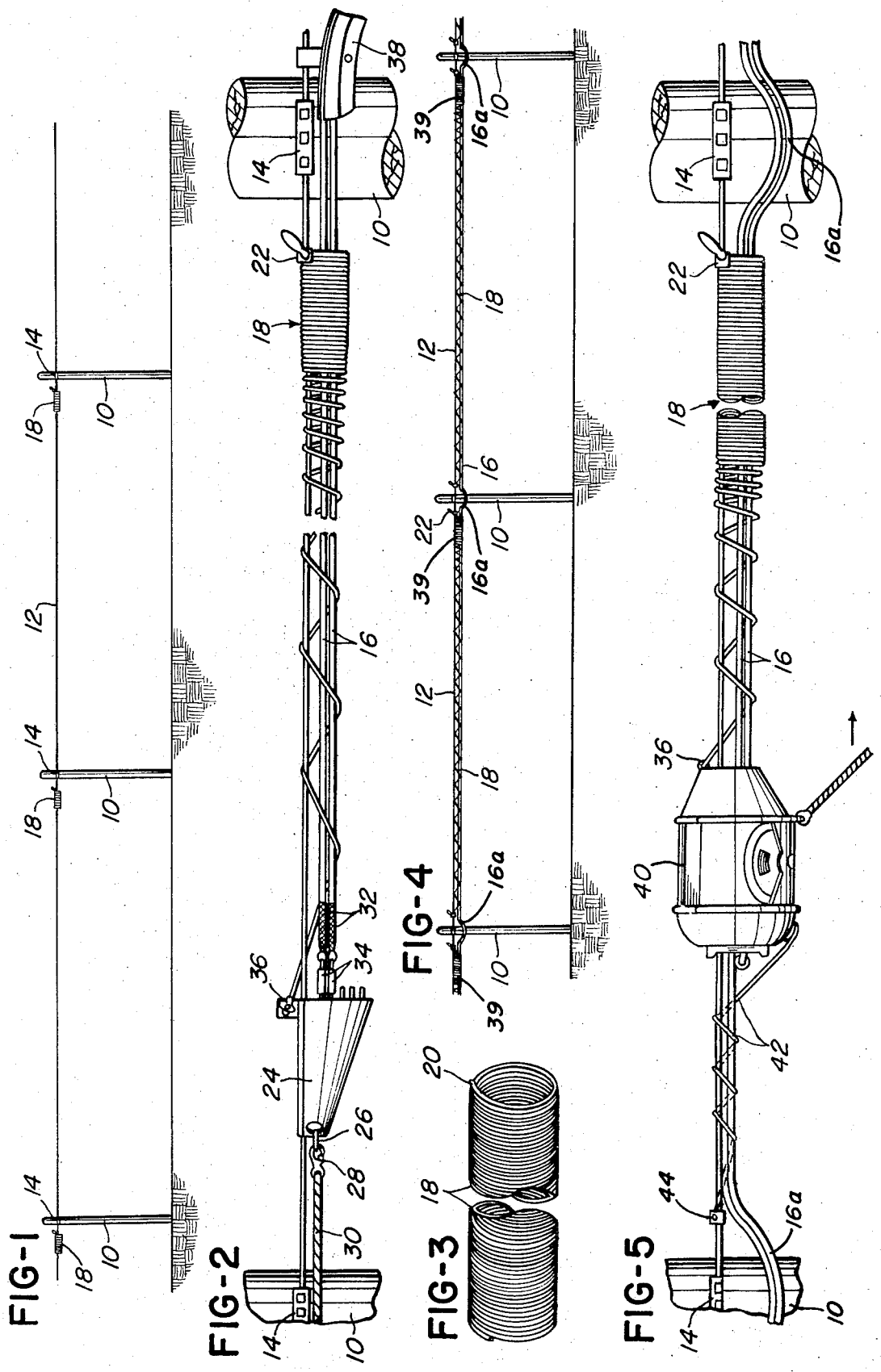

METHOD OF STRINGING AERIAL CABLE

BACKGROUND OF THE INVENTION

In conventional cable stringing operations the cable is supported beneath an existing messenger by a temporary support and a lasher is then moved along the messenger, spinning a helical wrapping of lashing wire about the cable and messenger to permanently mount the cable beneath the messenger. U.S. Pat. No. 2,277,935 shows one system of this type in which the cable is temporarily supported by rings or clamps before a permanent lashing is applied. Other examples of this type of system are shown in U.S. Pat. Nos. 2,332,112 and 3,185,444.

In the system disclosed in U.S. Pat. No. 2,767,742, a coil of hard drawn spring steel is mounted on an existing messenger and clamped thereto or to a supporting pole for the messenger and also to a puller mounted on the messenger. An end of a cable to be installed is also attached to the puller and as the puller is moved along the messenger it uncoils the spring steel wire, wrapping it about the messenger and the cable.

When the next pole is reached at the end of the span the end of the expanded coil is clamped to the pole or to the messenger adjacent the pole. The cable is then suspended beneath the messenger by several loose wraps of the expanded steel wire. Thereafter, linemen climb the poles at each end of the span and manipulate the coil from opposite ends until all of the slack is removed from the expanded coil. The ends of the coil are then permanently anchored to the messenger or the supporting poles.

Although this system offers the advantage of eliminating the use of aerial blocks, rings, clamps, etc. for temporarily suspending a cable beneath the messenger, as well as the elimination of the need for a lashing machine, the system does not appear to have obtained wide spread commercial success. One possible reason for this is that the material used in the coil must be of a relatively heavy gauge, high quality wire as compared to the wire normally used for lashing.

For example, a 14 gauge M.B. hard drawn spring steel wire, coated with a galvanizing finish and having a tensile strength of 210,000 to 230,000 psi is recommended by the manufacturer. Thus, because of the manner in which the coil is designed to function it must be heavier and of higher quality than the wire actually needed to support the cables beneath the messenger.

Additionally, it will be seen that after the initial positioning of the cable beneath the messenger the coil is only loosely wrapped about the messenger and cable and must be manipulated from both ends of a span to remove the slack from the coil. This requires either two linemen working from adjacent poles or requires a lineman to alternately climb the two poles and manipulate the coil from each end.

SUMMARY OF THE INVENTION

In accordance with the present invention a coil of resilient material is positioned about an existing messenger strand and one end of the coil is anchored to the strand or to an adjacent support, such as a pole. A puller is then mounted on the messenger and an opposite end of the coil is attached to the puller. The cable to be installed is threaded through the coil and also attached to the puller so that as the puller is moved along the messenger away from the anchored end of the coil, the coil is uncoiled and loosely wraps the messenger and the cable, temporarily suspending the cable beneath the messenger.

When the end of the span is reached, the coil is anchored to the supporting pole at that point or to the messenger, the puller is moved around the pole to the next span, another coil is positioned about the messenger and the cable and the process is repeated. This will generally take place along several spans, each of which will be on the order of 125 feet in length until perhaps some 2,000 feet of cable are supported beneath the messenger by the loosely wrapped turns of the resilient coils.

A lasher, which may be of conventional construction, such as that shown in U.S. Pat. No. 3,259,370, is mounted on the messenger downstream end of the coil at that point attached thereto. The lasher is then propelled along the messenger, recoiling the temporary supporting wire and replacing it with a permanent wrapping of relatively light gauge lashing wire.

Each time the lasher reaches the end of a span the coil of temporary supporting wire will have been recoiled to approximately its original configuration and it may be then removed for reuse. The lasher may then be positioned at the beginning of the next span to repeat the operation until the entire length of cable is permanently and tightly wrapped to the messenger with the relatively lighter gauge and lower quality lashing wire.

Thus, the relatively heavy gauge, high quality expensive coil may be reused repeatedly rather than being left in place at the installation. Additionally, it is unnecessary for the supporting coil to be manipulated to remove the slack therefrom since the coil serves only as a temporary support and the lasher applies a tight, permanent wrapping of supporting wire as it moves along the messenger collecting the coil of temporary supporting wire ahead of it.

As a result, the advantages of using a coil of resilient spring steel as a temporary support are obtained by the system of the present invention while the disadvantages of the expense of leaving the coil at the installations and the necessity of manipulating the coil after stringing are eliminated.

BRIEF DESCRIPTION OF THE DRAWINGS

FIG. 1 is a view of a typical system of supporting poles and messenger cable shown at an initial stage of the method of the present invention;

FIG. 2 is an enlarged view of one span showing a further stage of the method of the present invention;

FIG. 3 is a perspective view of a coil used in the present invention;

FIG. 4 is a view similar to FIG. 1 but showing a plurality of cables suspended beneath the messenger by a plurality of expanded coils; and FIG. 5 is another enlarged view of a span at one of the final stages in the method of the present invention.

DESCRIPTION OF THE PREFERRED EMBODIMENTS

As seen in FIG. 1 of the drawings, a typical system will include a plurality of supporting poles 10 having suspended therebetween a messenger cable 12. Typically, the messenger will be attached to the poles by means of three bolt clamps 14 (see also FIGS. 2 and 5) which may be of conventional construction. To install a cable 16 of, for example, the coaxial type, a plurality of coils 18 are mounted on the messenger cable 12 adjacent each of the supporting poles 10.

Coils 18 may be formed of a resilient plastic, a hard drawn spring steel wire or any other material which possess a high degree of resilience and sufficient strength to support one or more cables 16 beneath the messenger 12. A typical span between adjacent supporting poles 10 will be approximately 125 feet. Under these circumstances, a helix having an outside diameter of approximately 7 inches, a length of approximately 20 inches and a cross-sectional configuration of one-eighth inch can be expanded across a 125 foot span with the diameter of the coil reducing during expansion to approximately 3 inches.

The coil may be positioned on the messenger 12 by starting an open end 20 of the coil about the messenger and rotating the coil, either by hand or with commercially available tools, until the coil is positioned on the messenger as seen in FIG. 1 of the drawings. One end of the coil 18 is then anchored against movement by any suitable means, such as the hand operated clamp 22. While the coil is shown as clamped to the messenger, it will be obvious that the end of the coil could also be anchored to the supporting pole 10.

Thereafter, a puller 24, which may also be of conventional construction, is mounted on the messenger 12 for movement therealong. The puller 24 does not per se form part of the present invention and suffice to say it will be designed to either slide or roll along the messenger 12, and be provided with an eye 26 for the reception of a snap hook 28 attached to a towing cable 30.

At its rearward end the puller 24 may be provided with open mesh cable clamp members 32, which decrease in diameter as a pulling force is exerted to firmly grip the cables received therein. The members 32 are attached by swivels 34 to the rear of the puller 24. Two cables 16 and two cable gripping devices 32 are shown in the drawings, although it will be apparent that under ordinary conditions several of such cables may be pulled simultaneously by attaching additional gripping members 32 to the rear of the puller 24. Alternately a puller of the type shown in U.S. Pat. No. 3,596,878 or any of the commercially available pullers may be utilized.

In any case after the puller is mounted on the messenger adjacent a fully contracted coil 18, an end of the coil 18 opposite the end clamped to the messenger is attached to the puller 24 in any suitable manner, such as by means of a manually operated clamp 36. Cables 16 are then trained over a suitable guide 38, through coil 18 and into the cable clamping devices 32.

Puller 24 is then pulled along the messenger by means of the touring cable 30, simultaneously uncoiling the coil 18 and positioning the cables 16 beneath the messenger 12 as seen in FIG. 2 of the drawings. This operation is repeated for each span, with the end of the coil which had been attached to the puller being clamped to the messenger by any suitable means such as the manually operated clamp 22 used at the upstream end of the coil.

After the cables have been installed across several spans, to form a run of, for example, some 2,000 feet the configuration of the system will be as seen in FIG. 4 of the drawings, with the cables supported beneath the messenger 12 by a loose wrapping of the expanded coil 18. Preferably, the coil length, relative to the length of a span, is such that a portion of the coil remains uncoiled adjacent one end thereof, as indicated at 39 in FIG. 4 of the drawings. This ensures that the expanded coil is not over tightened by running it out to its extreme end. Additionally, the cables 16 will generally be provided with expansion loops 16a.

Thereafter, and preferably starting at the downstream end of the entire run, a lasher 40 is positioned on the messenger and the downstream end of the coil 18 at that point attached to the lasher by means of a clamp, such as the clamp 36. Alternately, the downstream end of the coil 18 may be hooked configuration for insertion through an opening formed in the lasher 40 or in the puller 24, thereby eliminating the necessity of an additional clamp for the puller or lasher.

Additionally, while the lasher will ordinarily be run along the messenger in an upstream direction, it could, of course, start at the opposite end and move downstream along the run. The lasher 40 may be of any conventional construction with several different types being commercially available.

The lasher is either towed along the messenger or, if the lasher is of the general type shown in U.S. Pat. No. 3,259,370, it may have its own source of power and be selfpropelled along the messenger. Regardless of the specific type of lasher used, as the lasher moves along the messenger it recoils the expanded coil 18 and wraps a tight wrapping of relatively inexpensive lashing wire 42 about the messenger and the cables 16 positioned therebeneath.

As noted above, the wire 42 used in the lashing operation will be of a lighter gauge and generally less expensive than the spring steel wire utilized in the coil 18. For example, the coil 18 may use a wire of approximately 14 gauge, M.B. hard drawn spring steel wire coated with a galvanizing finish and having a diameter of approximately 0.083 inch while the lashing wire 42 will ordinarily be a stainless steel wire of 0.045 to 0.065 inch in diameter.

Thus, as the lashing operation proceeds the relatively expensive coils 18 are replaced by the relatively inexpensive lashing wire 42, permitting the coils 18 to be removed from the messenger for reuse in subsequent operations. At each of its ends along each span, the lashing wire will ordinarily be permanently attached to the messenger on opposite sides of each expansion loop 16a by means of a lashing clamp or "bug" 44 as seen at the left hand side of FIG. 5.

Aside from the savings in material effected by replacing the coils 18 with standard lashing wire 42 after the coils have served their purpose of temporary supporting cable 16 beneath the messenger, it will be noted that the lashing wire is applied in even, tight turns to the cables and messenger and needs no further manipulation to tighten the wrappings, as would be the case if the coils 18 were used in their intended manner as permanent lashing for the cables 16.

While the method herein described constitutes a preferred embodiment of the invention, it is to be understood that the invention is not limited to this precise method, and that changes may be made therein without departing from the scope of the invention.

What is claimed is:

1. A method of installing cable comprising:

a. positioning a coiled strand of resilient, temporary, cable supporting material about a messenger suspended between a pair of spaced supports,
b. positioning a cable puller on said messenger adjacent said coil for movement along said messenger,
c. inserting one end of an elongated cable from a supply thereof through said coil and attaching it to said puller,
d. anchoring one end of said coil adjacent said support against movement and attaching the opposite end thereof to said puller,
e. moving said puller along said messenger away from said one end of said coil while uncoiling said resilient strand material to an expanded configuration about said messenger and said cable and temporarily suspending said cable from said messenger,
f. detaching said cable and said opposite end of said coil from said puller,
g. positioning a lasher on said messenger adjacent an end of said expanded coil,
h. attaching an end of said coil to said lasher,
i. moving said lasher along said messenger with an end of said coil attached thereto, and
j. simultaneously recoiling said coil to a contracted configuration while applying a helical wrapping of permanent lashing wire about said messenger and said cable to permanently suspend said cable from said messenger.

2. The method of claim 1 wherein said step of positioning a lasher on said messenger comprises:
a. positioning said lasher on said messenger adjacent said one end of said coil.

3. The method of claim 1 wherein said messenger extends between a plurality of successive supports to provide a plurality of successive spans and wherein said step of positioning a coiled strand on said messenger comprises:
a. positioning a coil for each span about the messenger adjacent a support for that span.

4. The method of claim 3 wherein said step of positioning a plurality of coils about said messenger comprises:
a. positioning said coil adjacent an upstream end of each of said spans.

5. The method of claim 1 wherein:
a. said step of uncoiling said resilient strand material comprises expanding said coil to a configuration where it loosely wraps said cable and said messenger, and
b. said step of applying helical wraps of permanent lashing wire comprises applying a tight wrap of lashing wire about said cable and said messenger.

6. The method of claim 1 wherein:
a. said step of positioning a coil of supporting strand material on said messenger comprises positioning a coil of relatively heavy gauge, spring steel wire about said messenger, and
b. said step of lashing said cable to said messenger comprises applying a helical wrapping of relatively light gauge stainless steel wire about said messenger and said cable.

* * * * *